No. 615,168. Patented Nov. 29, 1898.
G. K. HAMFELDT.
MECHANISM FOR SUPPORTING COUPLING PINS.
(Application filed Oct. 1, 1897.)
(No Model.) 3 Sheets—Sheet 1.
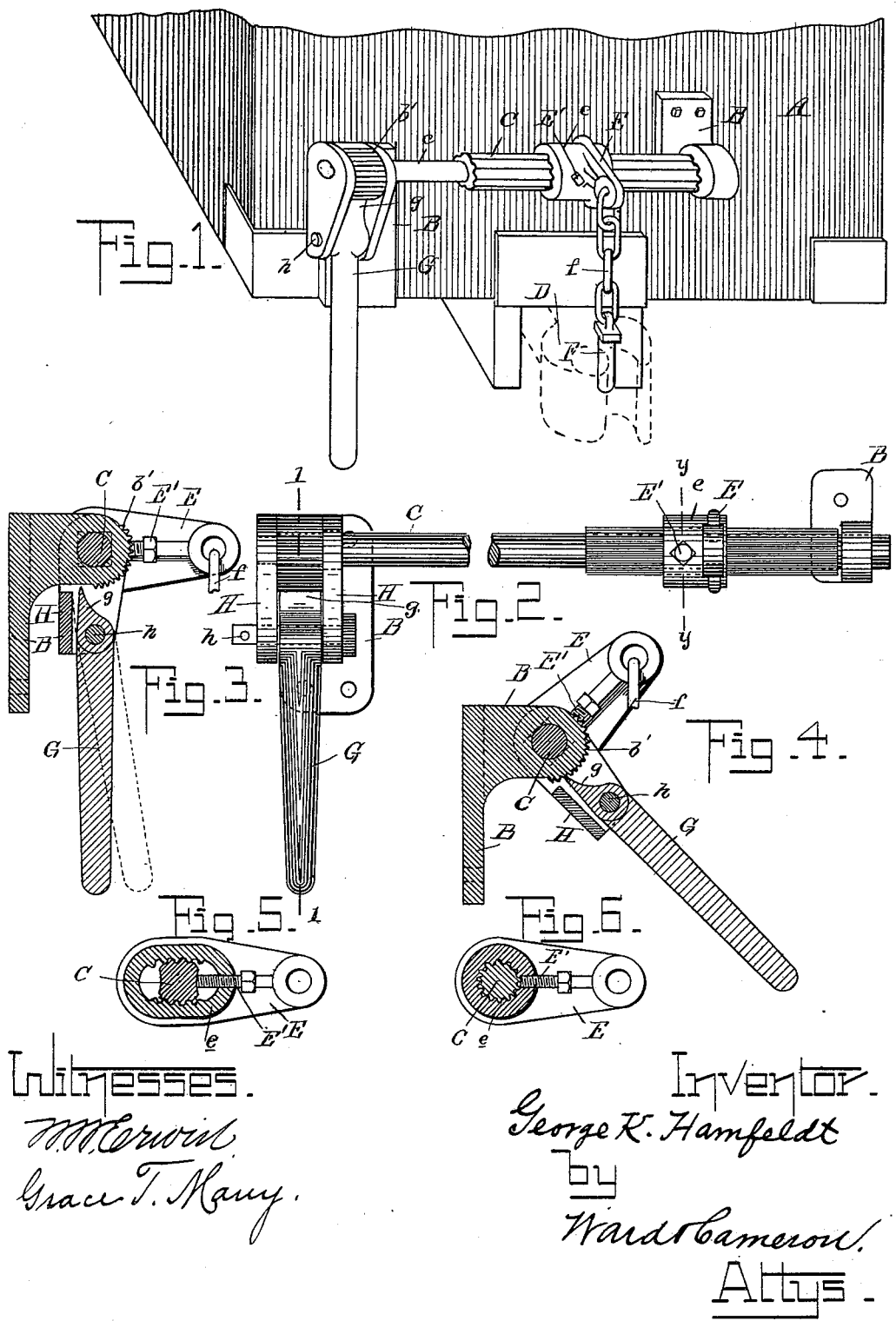

No. 615,168. Patented Nov. 29, 1898.
G. K. HAMFELDT.
MECHANISM FOR SUPPORTING COUPLING PINS.
(Application filed Oct. 1, 1897.)
(No Model.) 3 Sheets—Sheet 2.
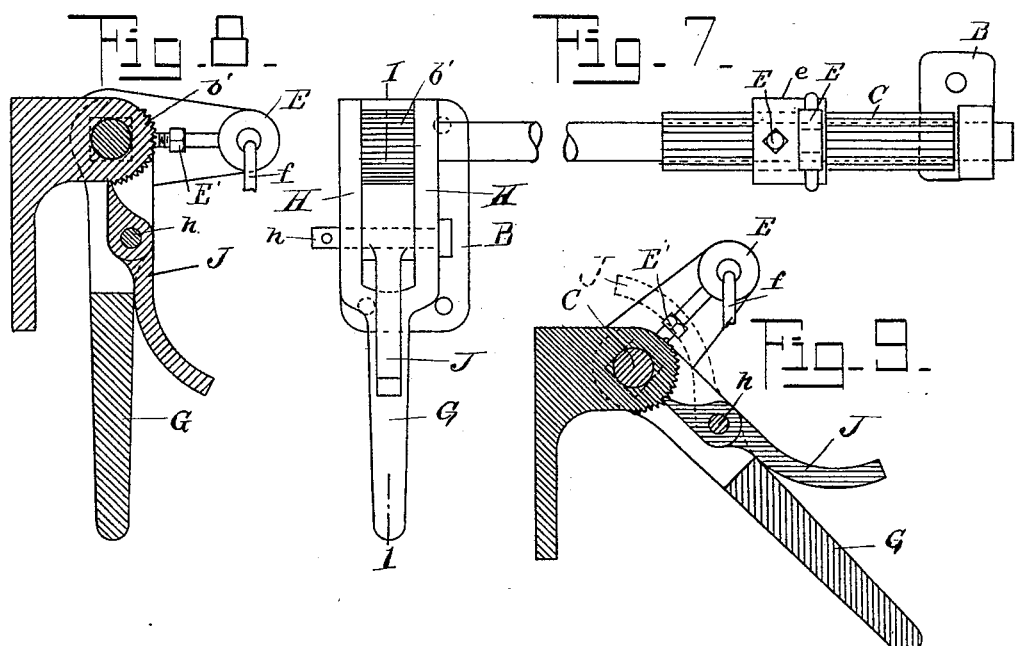
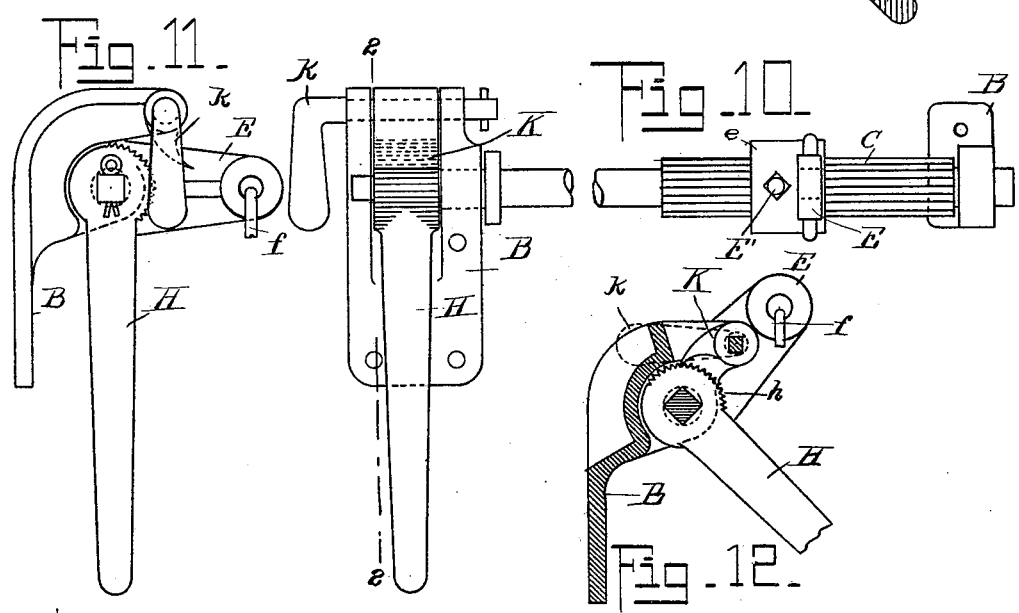
Witnesses:
W. W. Erwin
Grace T. Many
Inventor.
George K. Hamfeldt,
by Ward & Cameron
Attys.
THE NORRIS PETERS CO., PHOTO-LITHO., WASHINGTON, D. C.

No. 615,168. Patented Nov. 29, 1898.
G. K. HAMFELDT.
MECHANISM FOR SUPPORTING COUPLING PINS.
(Application filed Oct. 1, 1897.)
(No Model.) 3 Sheets—Sheet 3.
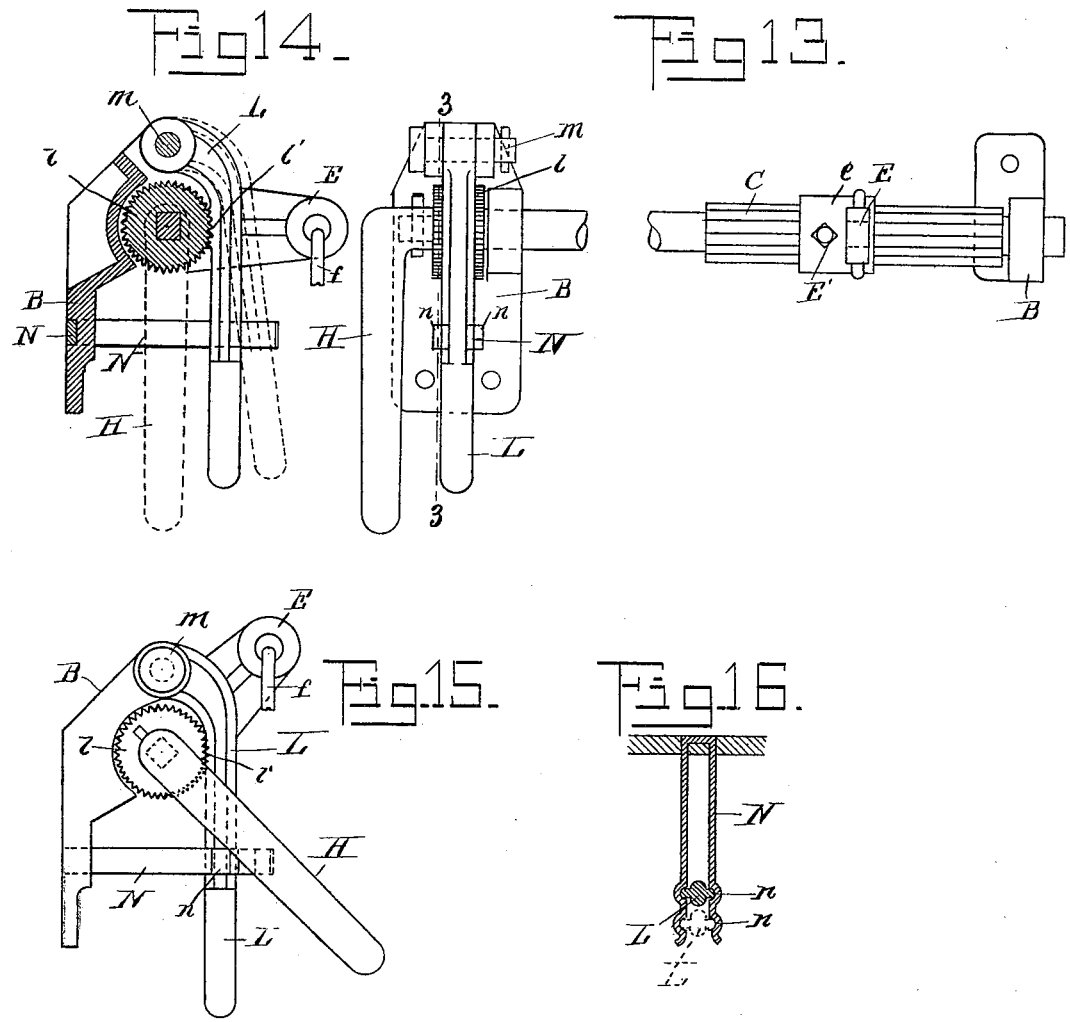
Witnesses
M. Erwin
Grace T. Many
Inventor
George K. Hamfeldt
by Ward & Cameron
Attys

UNITED STATES PATENT OFFICE.

GEORGE K. HAMFELDT, OF MENANDS, NEW YORK.

MECHANISM FOR SUPPORTING COUPLING-PINS.

SPECIFICATION forming part of Letters Patent No. 615,168, dated November 29, 1898.

Application filed October 1, 1897. Serial No. 653,711. (No model.)

*To all whom it may concern:*

Be it known that I, GEORGE K. HAMFELDT, a citizen of the United States, residing at Menands, in the county of Albany, State of New York, have invented a new and useful Improvement in Mechanism for Supporting the Coupling-Pin in Car-Couplers, of which the following is a specification.

My invention relates to car-coupling mechanism; and the object of my invention is to provide an easily-operative device for raising the main bolt of a car-coupler from the side of the car and holding the bolt in its elevated position as long as desired. I attain this object by means of the mechanism illustrated in the accompanying drawings, in which—

Figure 1 is an elevation of the end of a car, showing my device in perspective. Fig. 2 is a general plan view. Fig. 3 is a section along the line 1 1 on Fig. 2, showing the position of the parts when the coupling is made. Fig. 4 is a section similar to Fig. 3, but showing the parts in the position which they occupy when the coupling-pin is raised. Fig. 5 is a cross-section along the line Y Y on Fig. 2. Fig. 6 is a similar cross-section of a modified form. Fig. 7 is a general view in plan of a modified form. Fig. 8 is a section along the line 1 1 on Fig. 7. Fig. 9 is a similar section to Fig. 8, but showing the position when the main pin is raised. Fig. 10 is a general view of a second modified form. Fig. 11 is an end elevation. Fig. 12 is a similar view, in section, to Fig. 11, but showing the parts in the position they occupy when the pin is raised. Fig. 13 is a general view of a third modified form. Fig. 14 is a section along the line 3 3 on Fig. 13. Fig. 15 is an end elevation, and Fig. 16 is a detail view of the spring-retaining device.

Similar letters refer to similar parts throughout the several views.

It is desirable to provide a means for lifting the main pin from a car-coupler and retain it in its elevated position and to perform this result without going between the cars. In order that this devive may be used upon cars provided with different forms of coupler, it is desirable to arrange the apparatus so that it can be easily and speedily adjusted to conform with the various couplers used on railway-cars, and in order that it may be succesfully operated it should be simple in its construction and operate as easily as possible.

The device which I have invented is extremely simple in its construction and operation, and may be controlled by the expenditure of little force.

To the end of the car A, I support in suitable bearings B B a rod C, and immediately above the coupling D, I arrange, by means of a suitable collar $e$, mounted on the rod C, a lever E, to which is attached a link or chain $f$, which connects with the coupling-pin F. The collar $e$ and the lever E are preferably made integral, being cast together. For the purpose of adjusting the lever E on the rod C, I preferably make the rod C corrugated on its surface or provided with ribs extending therefrom, as shown in Figs. 5 and 6, and the collar $e$ being also provided with a serrated interior surface is adapted to engage with the surface of the rod C, and in the collar $e$ I arrange the adjusting-bolt E'. By means of the adjusting-bolt and the corrugations in the collar and on the rod I am thus enabled to place the lever E in such a position as will best suit the style of coupler with which it is to be used.

I have shown in Fig. 5 the collar $e$ provided with an elongated or elliptical opening. I may use that which is shown in Fig. 6, in which the collar has a circular opening. Either of these I may use. When I use that shown in Fig. 5, it is apparent that I may in three directions regulate the position of the lever E, and when that shown in Fig. 6 is used I may regulate the lever in but two directions.

For the purpose of operating the device I place near one end of the rod C the forked lever H. The rod C is squared, provided with a gudgeon $c$, which is squared at the part which engages with the forked lever H, so arranged that when the lever H is lifted or raised the rod C will be revolved. Upon the convex portion $b$ of the bearing B, I arrange a series of teeth $b'$, with which the end $g$ of the handle G, which is constructed with a feather-edge, will engage. Thus when the handle G is raised, moving it to the position shown by dotted lines in Fig. 3, the portion $g$ of the handle G will come in contact with the forked lever H. A further movement of the handle G will raise the forked lever H, the handle G being mounted between the forks of said lever at $h$, and thus the rod C will be revolved and the lever E raised, lifting the main pin F from the coupler.

In order to hold the pin in its elevated position, a quick downward movement is given to the handle G, when the end $g$ of the handle will engage with the teeth $b'$ on the bearing B, as shown in Fig. 4, thus preventing gravity from forcing downward the coupling-pin. When it is desired to cause the pin to descend, the handle G is raised slightly, breaking the connection between the end $g$ of the handle G and the teeth $b'$ and then allowing the handle, and therefore the lever E, to descend by gravity.

The modification shown in Figs. 7, 8, and 9 differs in that the handle G is connected directly to the forked lever H or made integral therewith and is provided with a lever J, which is suitably mounted and is so arranged to engage with the teeth $b'$ when it is desired to hold the pin in the elevated position. The lever J when disengaged may be thrown to the position shown in Fig. 9 by dotted lines, which will break its connection with the teeth and allow the force of gravity to bring the coupling-pin to its normal position.

That modified form shown in Fig. 10 consists principally of placing the lever H in connection with the rod C by a squared gudgeon or otherwise and placing on the end of the handle H teeth $h$, adapted to engage with a dog K, mounted in the bearing B, provided with a suitable handle $k$. Thus when the coupling-pin has been raised the handle $k$ of the dog K is placed in the position shown in Fig. 12, the dog then being in engagement with the teeth on the end of the handle H, and thus held in position. By reversing the handle the dog is relieved.

In the modification shown in Figs. 13, 14, 15, and 16, in addition to the handle H, which has a toothed wheel $l$ thereon, which is provided near its connection with the bearing B with a toothed projecting portion, I arrange a locking-handle L, mounted at $m$ and which is provided along its surface toward the handle H with a series of serrations $l'$, adapted to engage with the teeth on the wheel $l$. Thus when the handle H is moved to a position desired the locking-handle L is drawn in connection with the wheel $l$, which prevents gravity from causing the coupling-pin to descend. In order to hold the locking-handle L in position, I arrange a spring retaining device N, which consists of two spring-bars a slight distance apart, provided with two or more humps $n\ n$, making recesses between the parallel spring-bars and so arranged that when the locking-handle L is placed between the parallel portions of the spring N the tendency of the spring will be to hold the locking-handle in its position within the recesses $n$.

What I claim as my invention, and desire to secure by Letters Patent, is—

1. In a device for elevating and retaining in its elevated position a coupling-pin, the combination of a lever, a rod upon which said lever is mounted, a chain connecting said lever with the coupling-pin, a means for adjusting said lever on said rod, a suitable bearing for said rod, a lever placed near one end of said rod, a dog adapted to engage with a ratchet or rack connected with the bearing adjacent to said lever near the end of the rod, so arranged that when the lever near the end of the rod is raised, the coupling-pin shall be raised and the dog shall engage with the ratchet, holding the pin elevated, substantially as described and for the purpose set forth.

2. In a device for elevating and retaining in its elevated position a coupling-pin, the combination of a lever, a rod upon which the same is mounted, a coupling-pin, a link connecting said coupling-pin to said lever, the periphery of said rod serrated, a means for adjusting said lever on said serrated rod, bearings for supporting said rod, a lever placed near one end of said rod and secured thereto, by the operation of which said rod shall be given a revolutionary movement, a dog, connected with or adjacent to said last-mentioned lever, a ratchet connected with the bearing adjacent to said last-mentioned lever, so mounted up that the dog may be caused to engage with said ratchet when the coupling-pin is suspended, substantially as described and for the purpose set forth.

3. In a device for elevating and retaining in its elevated position a coupling-pin, the combination of a rod having a serrated surface, a lever provided with a collar, said collar having an interior serrated surface adapted to engage with the serrations on said rod, an adjustable pin or bolt adapted to pass through said collar and engage with said rod, a means for connecting said lever with a coupling-pin, with a device for rotating said lever and raising said coupling-pin, and retaining said lever and coupling-pin in the raised position, substantially as described and for the purpose set forth.

4. In a device for elevating and retaining in its elevated position a coupling-pin, the combination of a lever, the rod upon which it is mounted, a coupling-pin, a link connecting said lever and said coupling-pin, an operating-lever pivoted near the end of said rod, a bearing provided with exterior serrations, said operating-rod provided at one end with means for engaging with said serrations and thus holding the pin in its elevated position, preventing the rotation of the rod, substantially as described and for the purpose set forth.

GEORGE K. HAMFELDT.

Witnesses:
 FREDERICK W. CAMERON,
 GRACE T. MANY.